(12) United States Patent
Nguyen Van et al.

(10) Patent No.: US 9,809,220 B2
(45) Date of Patent: Nov. 7, 2017

(54) DRIVE ASSIST DEVICE, AND DRIVE ASSIST METHOD

(71) Applicant: TOYOTA JIDOSHA KABUSHIKI KAISHA, Toyota-shi, Aichi (JP)

(72) Inventors: Quy Hung Nguyen Van, Susono (JP); Hiroshi Kishi, Shizuoka (JP); Shintaro Yoshizawa, Gotemba (JP); Hirokazu Kikuchi, Hadano (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 4 days.

(21) Appl. No.: 14/785,044

(22) PCT Filed: Apr. 25, 2013

(86) PCT No.: PCT/JP2013/062243
§ 371 (c)(1),
(2) Date: Oct. 16, 2015

(87) PCT Pub. No.: WO2014/174637
PCT Pub. Date: Oct. 30, 2014

(65) Prior Publication Data
US 2016/0082955 A1 Mar. 24, 2016

(51) Int. Cl.
*B60W 30/09* (2012.01)
*B60T 7/12* (2006.01)
(Continued)

(52) U.S. Cl.
CPC .............. *B60W 30/09* (2013.01); *B60T 7/12* (2013.01); *B60T 7/22* (2013.01); *B60W 30/08* (2013.01);
(Continued)

(58) Field of Classification Search
CPC ................ B60W 30/09; B60W 30/08; B60W 2550/304; B60W 2550/308; G08G 1/166;
(Continued)

(56) References Cited

U.S. PATENT DOCUMENTS

| | | | |
|---|---|---|---|
| 2010/0106387 A1 | 4/2010 | Tsuchida | |
| 2010/0209885 A1* | 8/2010 | Chin ................ | G09B 19/167 434/65 |

(Continued)

FOREIGN PATENT DOCUMENTS

| | | |
|---|---|---|
| JP | 2008-308024 A | 12/2008 |
| JP | 2011-006038 A | 1/2011 |

(Continued)

OTHER PUBLICATIONS

Nguyen Van Quy Hung, et al., "A Study on Driver's total Perception Risk Estimate and Its Applications", JSAE Annual Congress, May 18, 2015, pp. 1101-1106.

*Primary Examiner* — Mussa A Shaawat
*Assistant Examiner* — Jordan S Fei
(74) *Attorney, Agent, or Firm* — Sughrue Mion, PLLC

(57) ABSTRACT

According to an embodiment, there is provided a drive assist device including an index calculation unit configured to calculate an index relating to a relative relationship between a vehicle and a target object and a drive assist determination unit configured to determine whether to execute a drive assist control of the vehicle based on the index and as the vehicle width direction component of the relative speed between the vehicle and the target object decreases, the index calculation unit calculates the index with increasing a degree of influence of the relative relationship relating to the vehicle width direction component, or as the vehicle width direction component of the relative distance between the vehicle and the target object increases, the index calculation (Continued)

unit calculates the index with increasing the degree of influence of the relative relationship relating to the vehicle width direction component.

16 Claims, 9 Drawing Sheets

(51) Int. Cl.
    *B60W 30/08*     (2012.01)
    *G08G 1/16*     (2006.01)
    *B60T 7/22*     (2006.01)

(52) U.S. Cl.
    CPC ............... *G08G 1/16* (2013.01); *G08G 1/166* (2013.01); *B60T 2201/022* (2013.01); *B60W 2550/304* (2013.01); *B60W 2550/308* (2013.01)

(58) Field of Classification Search
    CPC ..... G08G 1/16; B60T 7/22; B60T 7/12; B60T 2201/022
    See application file for complete search history.

(56) References Cited

U.S. PATENT DOCUMENTS

| | | | |
|---|---|---|---|
| 2012/0035846 A1* | 2/2012 | Sakamoto | B60T 8/17558 |
| | | | 701/301 |
| 2012/0116665 A1 | 5/2012 | Aoki et al. | |
| 2014/0222326 A1 | 8/2014 | Sato et al. | |
| 2016/0101779 A1* | 4/2016 | Katoh | G06T 7/60 |
| | | | 340/435 |

FOREIGN PATENT DOCUMENTS

| | | |
|---|---|---|
| JP | 2013/030903 A1 | 3/2013 |
| JP | 2013-171439 A | 9/2013 |

* cited by examiner

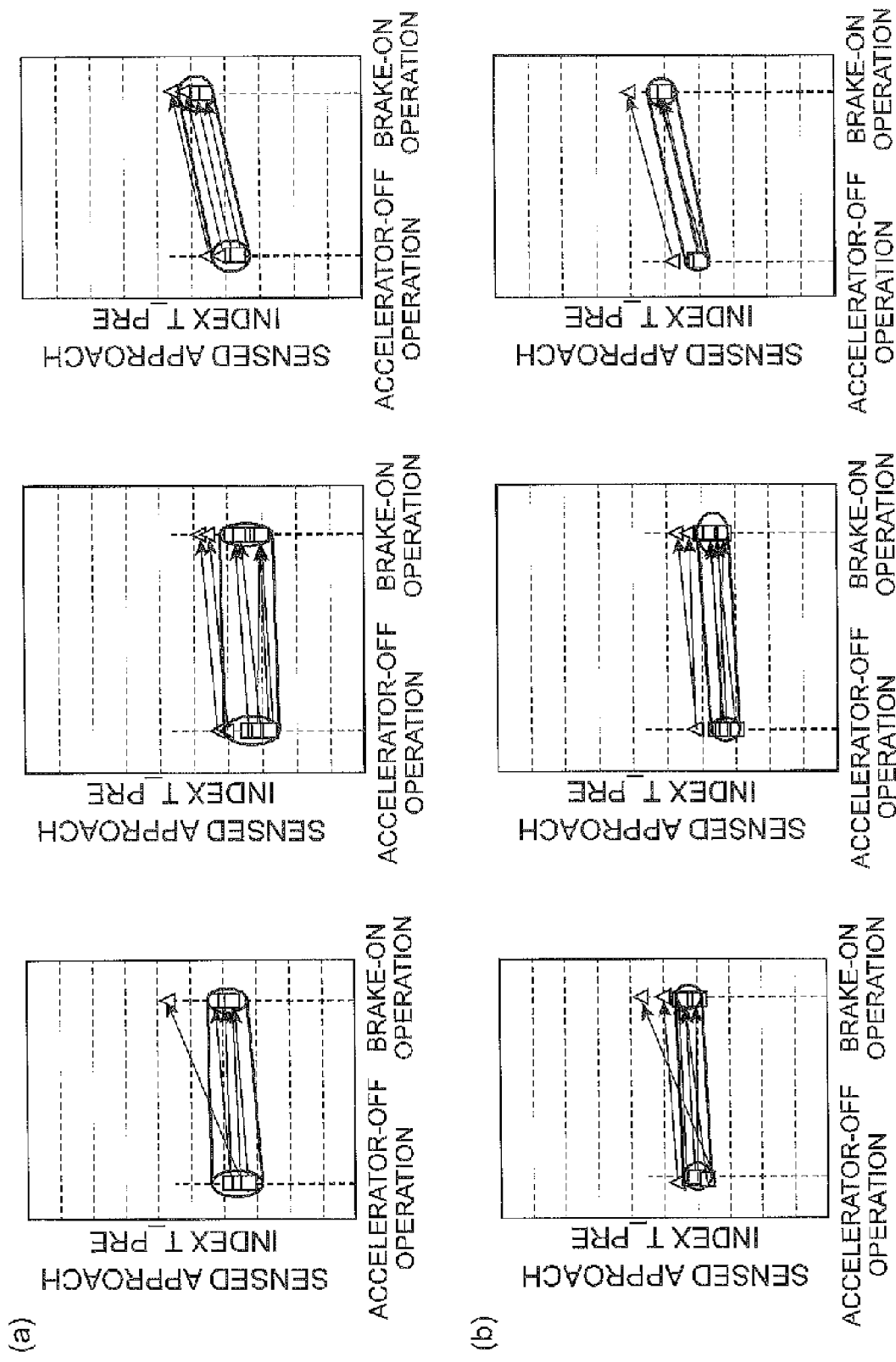

DRIVE ASSIST DEVICE, AND DRIVE ASSIST METHOD

CROSS REFERENCE TO RELATED APPLICATIONS

This application is a National Stage of International Application No. PCT/JP2013/062243 filed Apr. 25, 2013, the contents of all of which are incorporated herein by reference in their entirety.

TECHNICAL FIELD

The present invention relates to a drive assist device and a drive assist method configured to assist a driving of a driver.

BACKGROUND ART

In the related art, a device is known, which is configured to determine whether to execute a drive assist using a TTC which is a time to collision between a host vehicle and an obstacle. For example, in Patent Literature 1, it is disclosed that the pre-crash safety (PCS) control is executed in a case where a possibility of collision calculated based on the TTC between a host vehicle and a target object (an obstacle or the like) exceeds a reference value.

CITATION LIST

Patent Literature

[Patent Literature 1] Japanese Unexamined Patent Application Publication No. 2008-308024
[Patent Literature 2] Japanese Unexamined Patent Application Publication No. 2011-006038

SUMMARY OF INVENTION

Technical Problem

Incidentally, a driver performs a driving operation for avoiding the obstacle at the timing according to a sensed approach toward the target object as perceived by the driver. It can be assumed that the target object takes various behaviors such as a sudden movement, a sudden stop, a rapid change of travelling direction. The sensed approach toward the target object as perceived by the driver changes in accordance with such behaviors from the target object.

The device disclosed in Patent Literature 1 determines whether to execute the drive assist control based only on the physical information such as a relative speed, a relative distance or the like between the host vehicle and the target object. The sensed approach perceived by the driver, which is changed by the behaviors of the target object, is not considered. For this reason, the drive assist executed for the target object depending on its behaviors may cause the driver discomfort.

Therefore, in this technical field, a drive assist device and a drive assist method is demanded, with which the drive assist control can be executed without causing the driver discomfort.

Solution to Problem

According to an aspect of the present invention, there is provided a drive assist device including an index calculation unit configured to calculate an index relating to a relative relationship between a vehicle and a target object and a drive assist determination unit configured to determine whether to execute a drive assist control of the vehicle based on the index. As a vehicle width direction component of a relative speed between the vehicle and the target object decreases, the index calculation unit calculates the index with increasing a degree of influence of the relative relationship relating to the vehicle width direction component among the relative relationships between the vehicle and the target object, or as a vehicle width direction component of a relative distance between the vehicle and the target object increases, the index calculation unit calculates the index with increasing the degree of influence of the relative relationship relating to the vehicle width direction component among the relative relationships between the vehicle and the target object.

The inventors of the present invention found that the driver tends to perform an active driving operation such as performing the driving operation be at an earlier start timing or increasing the operation quantity and avoid the target object in a case where the vehicle width direction component of the relative speed between the vehicle and the target object, is relatively small or in a case where the vehicle width direction component of the relative distance between the vehicle and target object is relatively large. It is estimated that this driver's behavior is caused by the fact that the future behavior of the target object is not clear and the driver feels a high risk when movement of the target object in the vehicle width direction is not sudden. According to the drive assist device, as the vehicle width direction component of the relative speed between the vehicle and the target object relatively decreases or as the vehicle width direction component of the relative distance between the vehicle and target object relatively increases, the index is calculated with increasing the degree of influence of the relative relationship relating to the vehicle width direction component among the relative relationships between the vehicle and the target object. Therefore, it is possible to acquire the index in line with the feeling of the driver. Then, it is possible to execute the drive assist control without causing the driver discomfort, by determining to execute the drive assist control of the vehicle based on the index.

In an embodiment, as a lateral sensed approach decreases, which is expressed by a ratio of the vehicle width direction component of the relative speed and the vehicle width direction component of the relative distance, the index calculation unit may calculate the index with increasing the degree of influence of the relative relationship relating to the vehicle width direction component among the relative relationships between the vehicle and the target object.

According to the embodiment, the procedure of calculating the index is changed according to the lateral sensed approach which influences the driving operation timing of the driver, and the execution of the drive assist control is determined by the index. Therefore, it is possible to execute the drive assist control without causing the driver discomfort.

In an embodiment, in a case where the lateral sensed approach is smaller than a predetermined threshold value, the index calculation unit may calculate the index by using the relative relationship relating to the vehicle width direction component and the relative relationship relating to a vehicle travelling direction component among the relative relationships between the vehicle and the target object, and in a case where the lateral sensed approach is equal to or greater than the predetermined threshold value, the index calculation unit may calculate the index using the relative relationship relating to the vehicle travelling direction component among the relative relationships between the vehicle and the target object.

According to the embodiment, the procedure of calculating the index is changed according to the lateral sensed approach which influences the driving operation timing of the driver, and the execution of the drive assist control is determined by the index. Therefore, it is possible to execute the drive assist control without causing the driver discomfort.

In an embodiment, in a case where the lateral sensed approach is smaller than a predetermined threshold value, the index calculation unit may calculate a value resulting from dividing a term including a sum of the vehicle travelling direction component of the relative speed and the vehicle width direction component of the relative speed by a sum of the vehicle travelling direction component of the relative distance and the vehicle width direction component of the relative distance as the index, and in a case where the lateral sensed approach is equal to or greater than the predetermined threshold value, the index calculation unit may calculate a value resulting from dividing a term including the vehicle travelling direction component of the relative speed by a term including the vehicle travelling direction component of the relative distance as the index.

According to the embodiment, it is possible to acquire the index in line with the feeling of the driver according to the lateral sensed approach which influences the driving operation timing of the driver. In this way, it is possible to execute the drive assist control without causing the driver discomfort.

In an embodiment, in a case where the lateral sensed approach is smaller than a predetermined threshold value, the index calculation unit may calculate the index using below-described Equation (1), $$T\_PRE = \{(V + B \cdot A_x) + K1 \cdot V_d\} / \{L + K2 \cdot D\} \quad (1),$$

and in a case where the lateral sensed approach is equal to or greater than the predetermined threshold value, the index calculation unit may calculate the index using below-described Equation (2), $$T\_PRE = (V + B \cdot A_x) / L \quad (2)$$

(In Equations (1) and (2), T_PRE is the index, V is the vehicle travelling direction component of the relative speed, $V_d$ is the vehicle width direction component of the relative speed, $A_x$ is a deceleration of the vehicle, L is the vehicle travelling direction component of the relative distance, D is the vehicle width direction component of the relative distance, B is a predetermined coefficient, and K1 and K2 are arbitrary coefficients.)

According to the embodiment, it is possible to acquire the index in line with the feeling of the driver according to the lateral sensed approach which influences the driving operation timing of the driver. In this way, it is possible to execute the drive assist control without causing the driver discomfort.

In an embodiment, in a case where the target object approaches the vehicle, the drive assist determination unit may determine whether to execute the drive assist control based on the index.

According to the embodiment, in a situation in which there is a possibility of collision between the host vehicle and the target object, it is possible to determine whether to execute the drive assist control.

In an embodiment, the drive assist determination unit may include an operation timing determination unit configured to determine, based on the index, a first recommended operation timing that indicates a timing at which a first driving operation which changes the behavior of the vehicle is performed, and an estimation unit configured to estimate, at the timing earlier than the first recommended operation timing, whether a driver of the vehicle performs the first driving operation at the first recommended operation timing, and in a case where it is estimated by the estimation unit that the driver of the vehicle does not perform the first driving operation at the first recommended operation timing, the drive assist determination unit may determine to execute the drive assist control.

According to the embodiment, it is possible to estimate whether the driver perform the first driving operation, at the timing earlier than the first recommended operation timing. Therefore, it is possible to estimate whether the driving operation of the driver is appropriate. By executing the drive assist control, it is possible to provide the drive assist control that is not troublesome to the driver earlier in a case where it is estimated that the first driving operation is not performed at the first recommended operation timing.

In an embodiment, the estimation unit may estimate whether the driver of the vehicle performs the first driving operation at the first recommended operation timing based on the execution timing of the second driving operation which is performed by the driver at the timing earlier than the first driving operation.

According to the embodiment, at the execution timing of the second driving operation which is performed by the driver at the timing earlier than the first driving operation timing, it is possible to estimate whether the driver of the vehicle performs the first driving operation at the first recommended operation timing. Therefore, it is possible to estimate whether the driving operation of the driver is appropriate at the early stage.

In an embodiment, based on the index, the operation timing determination unit may determine a second recommended operation timing that indicates a timing at which the second driving operation is performed, and in a case where the driver does not perform the second driving operation at the second recommended operation timing, the estimation unit may estimate that the driver of the vehicle does not perform the first driving operation at the first recommended operation timing.

According to the embodiment, at the execution timing of the second driving operation which is performed by the driver at the timing earlier than the first driving operation timing, it is possible to estimate whether the driver of the vehicle performs the first driving operation at the first recommended operation timing. Therefore, it is possible to estimate whether the driving operation of the driver is appropriate at the early stage.

In an embodiment, the first driving operation may be a braking operation by the driver and may be a brake-on operation by the driver. In an embodiment, the second driving operation may be an operation of an accelerator or a shift operation by the driver and may be an accelerator-off operation or a shift-up operation by the driver.

In an embodiment, the estimation unit may estimate whether the driver of the vehicle performs the first driving operation at the first recommended operation timing based on the travel state of the vehicle at the timing earlier than the first recommended operation timing.

According to the embodiment, at the timing earlier than the first recommended operation timing, it is possible to estimate whether the driver of the vehicle performs the first driving operation at the first recommended operation timing.

In an embodiment, in a case where a deceleration quantity of the vehicle at the timing earlier than the first recommended operation timing is smaller than a predetermined deceleration quantity, the estimation unit may estimate that the driver does not perform the first driving operation at the first recommended operation timing.

According to the embodiment, at the timing earlier than the first recommended operation timing, it is possible to appropriately estimate whether the driver perform the first driving operation at the first recommended operation timing.

In an embodiment, in a case where an engine speed of the vehicle at the timing earlier than the first recommended operation timing is less than a predetermined engine speed, the estimation unit may estimate that the driver does not perform the first driving operation at the first recommended operation timing.

According to the embodiment, it is possible to appropriately estimate whether the driver performs the first driving operation at the first recommended operation timing, at the timing earlier than the first recommended operation timing.

According to another aspect of the present invention, there is provided a drive assist device including an operation timing determination unit configured to determine a first recommended operation timing that indicates a timing at which a first driving operation to change a behavior of a vehicle is performed based on an index relating to a relative relationship between the vehicle and a target object, an estimation unit configured to estimate, at the timing earlier than the first recommended operation timing, whether a driver of the vehicle performs the first driving operation at the first recommended operation timing, and a drive assist determination unit configured to determine to execute the drive assist of the vehicle in a case where it is estimated by the estimation unit that the driver does not perform the first drive operation at the first recommended operation timing, the operation timing determination unit determines the first recommended operation timing such that the timing becomes early as a vehicle width direction component of the relative speed between the vehicle and the target object decreases or the vehicle width direction component of the relative distance between the vehicle and the target object increases.

The inventors of the present invention found that, in a case where the vehicle width direction component of the relative speed between the vehicle and the target object is relatively small or in a case where the vehicle width direction component of the relative distance between the vehicle and target object is relatively large, the driver makes the start timing of the driving operation for avoiding the target object earlier. It is estimated that this behavior is caused by the fact that the future behavior of the target object is not clear and the driver feels a high risk in a case where the movement of the target object in the vehicle width direction is not fast. Based on this findings, in the drive assist device in the other aspect of the present invention, in a case where the vehicle width direction component of the relative speed between the vehicle and the target object is small or in a case where the vehicle width direction component of the relative distance between the vehicle and target object is large, it is possible to make the start timing of the drive assist appropriate by making the first recommended operation timing earlier. In this way, it is possible to execute the drive assist control without causing the driver discomfort.

In an embodiment, the estimation unit may estimate whether the driver of the vehicle performs the first driving operation at the first recommended operation timing based on the execution timing of the second driving operation which is performed by the driver at the timing earlier than the first driving operation.

According to the embodiment, at the execution timing of the second driving operation which is performed by the driver at the timing earlier than the first driving operation timing, it is possible to estimate whether the driver of the vehicle performs the first driving operation at the first recommended operation timing. Therefore, it is possible to estimate whether the driving operation of the driver is appropriate at the early stage.

In an embodiment, the operation timing determination unit may determine the second recommended operation timing that indicates a timing at which the second driving operation is performed, based on the travel state of the vehicle, and the estimation unit may estimate that the driver of the vehicle does not perform the first driving operation at the first recommended operation timing, in a case where the driver does not perform the second driving operation at the second recommended operation timing.

According to the embodiment, at the execution timing of the second driving operation which is performed by the driver at the timing earlier than the first driving operation, it is possible to estimate whether the driver of the vehicle performs the first driving operation at the first recommended operation timing. Therefore, it is possible to estimate whether the driving operation of the driver is appropriate at the early stage.

According to still another aspect of the present invention, there is provided a drive assist method including an index calculation step of calculating an index relating to a relative relationship between a vehicle and a target object, and a drive assist determination step of determining whether to execute a drive assist control of the vehicle based on the index, in the index calculation step, as the vehicle width direction component of the relative speed between the vehicle and the target object decreases, the index is calculated with increasing a degree of influence of the relative relationship relating to the vehicle width direction component among the relative relationships between the vehicle and the target object, or as the vehicle width direction component of the relative distance between the vehicle and the target object increases, the index is calculated with increasing the degree of influence of the relative relationship relating to the vehicle width direction component among the relative relationships between the vehicle and the target object.

As described above, in the drive assist method in an aspect of the present invention, it is possible to execute the drive assist control without causing the driver discomfort.

Advantageous Effects of Invention

According to various aspects or the embodiment of the present invention, it is possible to execute the drive assist control without causing the driver discomfort.

BRIEF DESCRIPTION OF DRAWINGS

FIG. 9 is a diagram illustrating the sensed approach index at the timing when the examinee drivers operate an accelerator-off operation and the sensed approach index at the timing when the examinee driver operates a brake-on operation.

DESCRIPTION OF EMBODIMENTS

Figure 1:
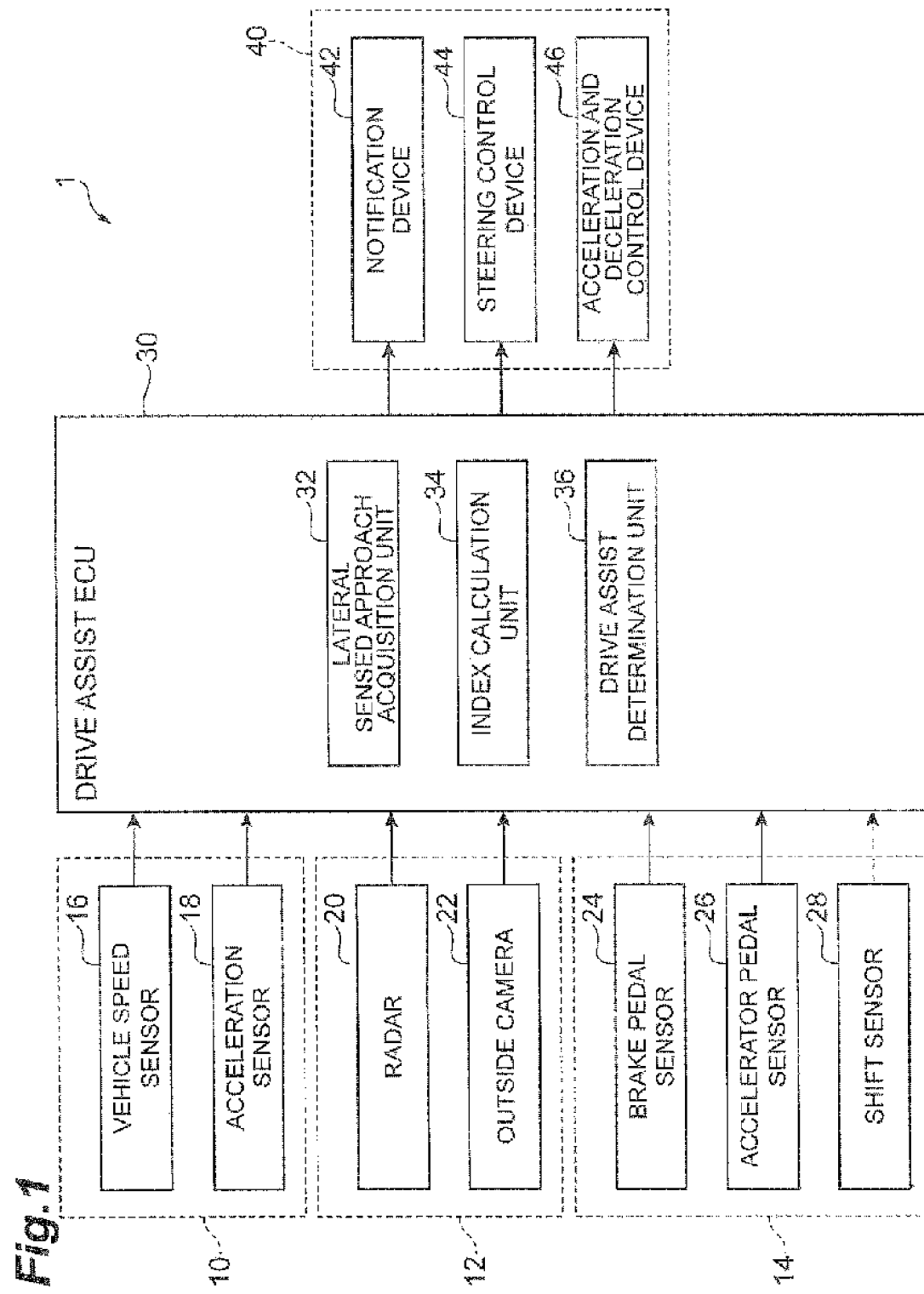
FIG. 1 is a block diagram illustrating a functional configuration of a drive assist device in an embodiment.

Hereinafter, a detailed description for the preferable embodiment of the present invention will be described with reference to the drawings. In the descriptions below, the same reference numerals will be given to the same or corresponding elements, and the description thereof will not be repeated.

FIG. 1 is a block diagram illustrating a functional configuration of a drive assist device in an embodiment. As illustrated in FIG. 1, the drive assist device 1 includes a travel state detection unit 10, a target object detection unit 12, a driving operation detection unit 14, a drive assist ECU 30, and an output unit 40.

The travel state detection unit 10 is a device configured to detect information relating to a travel state of a host vehicle. In the embodiment, the travel state detection unit 10 includes a vehicle speed sensor 16 and an acceleration sensor 20. The vehicle speed sensor 16 is a sensor configured to detect the speed of the host vehicle. The acceleration sensor 20 is sensor configured to detect an acceleration of the host vehicle. The travel state detection unit 10 outputs travel information of the host vehicle including the speed and the acceleration (deceleration) of the host vehicle detected using various sensors to the drive assist ECU 30.

The target object detection unit 12 is a device configured to detect a target object around the host vehicle. Here, the target object is a moving object that can be an obstacle such as another vehicle or a pedestrian existing around the host vehicle. In the embodiment, the target object detection unit 12 includes a radar 20 or an outside camera 22. The radar 20 is a device configured to measure a distance between the host vehicle and the target object, and for example, transmits an electromagnetic wave while scanning in a horizontal plane, receives a reflection wave which is reflected on the target object and coming back after, and then, from the frequency change of the received signal, acquires the information such as the presence or absence of the target object, a direction of the target object seen from the vehicle, the distance from the vehicle to the target object, and the relative speed of the target object to the vehicle. The outside camera 22 is, for example, a multiple-lens camera, and acquires the information such as the presence or absence of the target object, the direction of the target object seen from the vehicle, the relative distance from the vehicle to the target object, and the relative speed of the target object to the vehicle by imaging the front and rear direction and right and left direction of the host vehicle at a predetermined frequency. The target object detection unit 12 outputs target object information including the direction of the target object detected using various sensors, and the relative speed and the relative distance between the host vehicle and another vehicle to the drive assist ECU 30.

The driving operation detection unit 14 is a device configured to detect the driving operation operated by the driver. In the embodiment, the driving operation detection unit 14 includes a brake pedal sensor 24, an accelerator pedal sensor 26, and a shift sensor 28. The brake pedal sensor 24 is a sensor configured to detect a depression quantity of the brake pedal. The accelerator pedal sensor 26 is a sensor configured to detect a depression quantity of the acceleration pedal. The shift sensor 28 is a sensor configured to detect a shift position of a transmission shift lever. The driving operation detection unit 14 outputs the driving operation information including the content of the driving operation operated by the driver of the host vehicle to the drive assist ECU 30.

The drive assist ECU 30 is a computer that includes a central processing unit (CPU), a read only memory (ROM), a random access memory (RAM), and the like, and is a device configured to determine whether to execute the drive assist control of the host vehicle. The drive assist ECU 30 includes a lateral sensed approach acquisition unit 32, an index calculation unit 34 and a drive assist determination unit 36.

The lateral sensed approach acquisition unit 32 is means for acquiring the lateral sensed approach based on the host vehicle travel information output from the travel state detection unit 10 and the target object information output from the target object detection unit 12. Specifically, the lateral sensed approach acquisition unit 32 calculates a value that results from dividing a host vehicle width direction component of the relative speed between the host vehicle and the target object (hereinafter, simply referred to as "relative speed" also) by a host vehicle width direction component of the relative distance between the host vehicle and the target object (hereinafter, simply referred to as "relative distance" also) as the lateral sensed approach.

Figure 2:
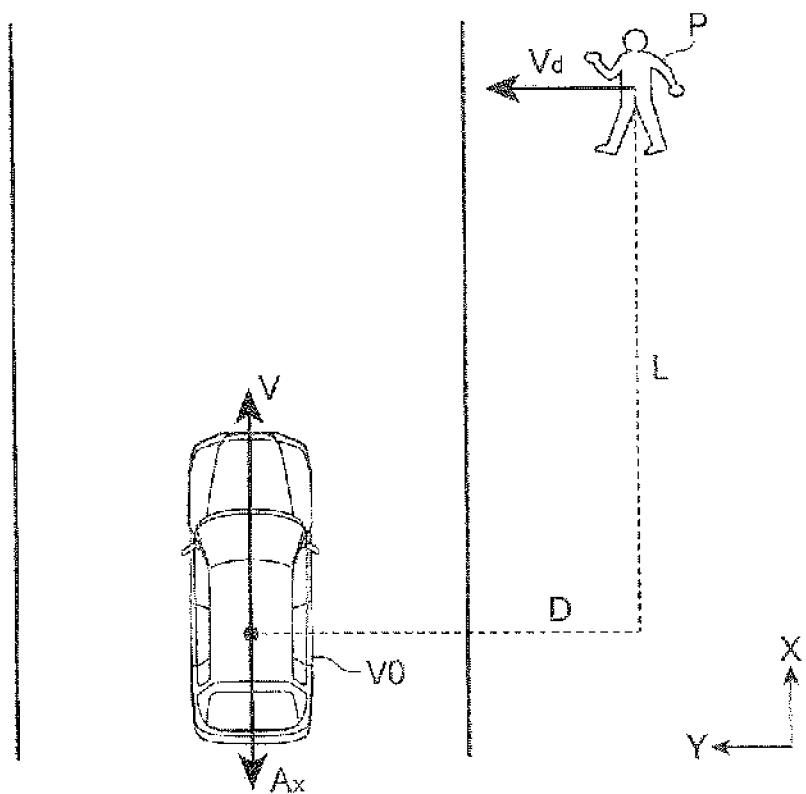
FIG. 2 is a diagram for explaining a procedure of acquiring a lateral sensed approach.

A procedure of acquiring the lateral sensed approach will be described in detail with reference to FIG. 2. For the convenience of the description in FIG. 2, X axis direction is assumed to be the travelling direction of the host vehicle and Y axis direction is assumed to be the host vehicle width direction component which is orthogonal to the X axis direction. FIG. 2 illustrates a situation in which a host vehicle V0 is travelling on the road in the X axis direction at a speed V and a pedestrian P is moving outside the road in the Y axis direction at a speed $V_d$. Hereinafter, the X direction component of the relative distance between the host vehicle V0 and the pedestrian P is assumed to be a distance L, the Y direction component of the relative distance between the host vehicle V0 and the pedestrian P is assumed to be a distance D, and the an acceleration (that is, a deceleration) of the host vehicle V0 in the −X direction is assumed to be $A_x$. In the embodiment, the lateral sensed approach acquisition unit 32 calculates $V_d/D$ as the lateral sensed approach. In the calculation by the lateral sensed approach acquisition unit 32, another physical quantity other than the relative speed $V_d$ may be further included in the numerator, and another physical quantity other than the distance D may be further included in the denominator.

The index calculation unit 34 is means for calculating an sensed approach index (index) T_PRE which relates to a relative relationship between the host vehicle and the target object. The sensed approach index T_PRE is an index representing the sensed approach between the driver of the host vehicle and the target object. The driver basically performs the driving operation such that the sensed approach with respect to the target object becomes substantially constant. In other words, the sensed approach index T_PRE is also referred to as an index indicating the operation timing characteristics of the driver of the host vehicle. The index calculation unit 34 calculates the sensed approach index T_PRE by Equation (3).

(approach change quantity in the travelling direction+$K1$×approach change quantity in the width direction)/(approach quantity in the travelling direction+$K2$×approach quantity in the width direction) (3)

In Equation (3), "approach change quantity in the travelling direction" is a physical quantity that includes at least one of a host vehicle travelling direction component of the relative speed or a host vehicle travelling direction component of the relative acceleration. The "approach change quantity in the width direction" is a physical quantity that includes at least one of the host vehicle width direction component of the relative speed or the host vehicle width direction component of the relative acceleration. In addition, "approach quantity in the travelling direction" indicates the host vehicle travelling direction component of the relative distance and the "approach quantity in the width direction" indicates the host vehicle width direction component of the relative distance. That is, in Equation (3), the "approach change quantity in the travelling direction" and "the approach quantity in the travelling direction" are the relative relationship relating to the travelling direction of the host vehicle among the relative relationships between the host vehicle and the target object, and the "approach change quantity in the width direction" and the "approach quantity in the width direction" are the relative relationship relating to the width direction of the host vehicle among the relative relationships between the host vehicle and the target object. In addition, K1 and K2 in Equation (3) are arbitrary weighting coefficients.

The index calculation unit 34 changes the procedure of calculating the sensed approach index T_PRE according to the lateral sensed approach calculated by the lateral sensed approach acquisition unit 32. Specifically, in a case where the lateral sensed approach is small, the index calculation unit 34 calculates the sensed approach index T_PRE with the K1 and K2 set higher than those in a case where the lateral sensed approach is large. Conversely, in a case where the lateral sensed approach is large, the index calculation unit 34 calculates the sensed approach index T_PRE with the K1 and K2 set lower than those in a case where the lateral sensed approach is small. That is, as the lateral sensed approach decreases, the index calculation unit 34 calculates the sensed approach index T_PRE with increasing a degree of influence of the relative relationship relating to the vehicle width direction component among the relative relationships between the host vehicle and the target object.

Figure 3:
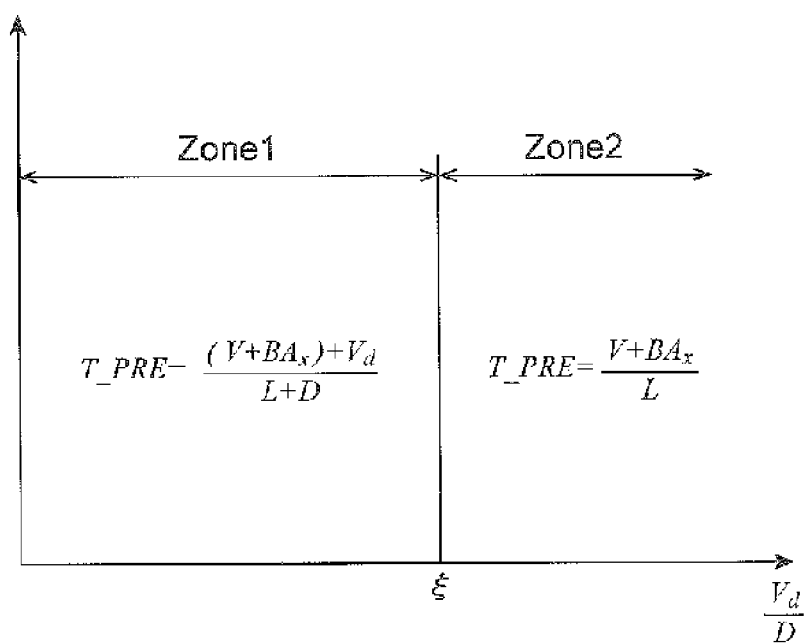
FIG. 3 is a diagram conceptually illustrating a relationship between the lateral sensed approach and an sensed approach index.

An example of calculation processing of the sensed approach index T_PRE by the index calculation unit 34 will be described in detail with reference to FIG. 2 and FIG. 3. FIG. 3 is a diagram conceptually illustrating the relationship between the lateral sensed approach and the sensed approach index T_PRE. In FIG. 3, the horizontal axis represents the lateral sensed approach $V_d/D$. As illustrated in FIG. 3, in a case where the lateral sensed approach $V_d/D$ is smaller than a constant $\xi$ (a predetermined threshold value) (in a case of a zone 1 illustrated in FIG. 3), the sensed approach index T_PRE is calculated by Equation (4). On the other hand, in a case where the lateral sensed approach $V_d/D$ is greater than the constant $\xi$ (in a case of a zone 2 illustrated in FIG. 3), the sensed approach index T_PRE is calculated by Equation (5). In Equations (4) and (5), B is a predetermined coefficient. Here, the constant $\xi$ is a designed value set by the designer in advance, and may be set as a different value depending on the driver based on the driving characteristics of the driver in the embodiment.

$$T\_PRE=\{(V+B\cdot A_x)+V_d\}/\{L+D\} \quad (4)$$

$$T\_PRE=(V+B\cdot A_x)/L \quad (5)$$

In the example illustrated in FIG. 3, the "approach change quantity in the travelling direction" in Equation (5) is $V+B\cdot A_x$, the "approach change quantity in the width direction" is $V_d$, the "approach quantity in the travelling direction" is L, and the "approach quantity in the width direction" is D. In addition, in a case where the lateral sensed approach $V_d/D$ is smaller than the constant $\xi$, the K1 and K2 are 1, and in a case where the lateral sensed approach $V_d/D$ is equal to or greater than the constant $\xi$, the K1 and K2 are zero. The increasing value of the sensed approach index T_PRE calculated by the Equations (4) and (5) proportionally indicates that there is insufficient time for operation by the driver (that is, the timing of the driving operation is delayed) and, conversely, the decreasing value of the sensed approach index T_PRE indicates that there is sufficient time for operation by the driver (that is, the timing of the driving operation is hastened).

Returning to FIG. 1, the drive assist determination unit 36 is means for determining whether to execute the drive assist control of the vehicle based on the sensed approach index T_PRE calculated by the index calculation unit 34. In a case where it is estimated by the sensed approach index T_PRE that the driving operation timing of the driver of the host vehicle is different from the ordinary driving operation timing, the drive assist determination unit 36 determines to execute the drive assist control. For example, in a case where the current sensed approach index T_PRE departs from the sensed approach index T_PRE at an ordinary approaching time in the past, the drive assist determination unit 36 determines to execute the drive assist control. Here, the execution of the drive assist control includes the drive assist for avoiding the collision with the target object and the drive assist for stabilizing the behavior of the vehicle. The drive assist for avoiding the collision with the target object includes the collision avoidance by the braking intervention, the collision avoidance by the steering intervention, and reminding the driver of the attention. In addition, the collision avoidance by the braking intervention and the steering intervention includes the intervention by an auto-braking or an auto-steering, an auxiliary braking force or the steering force, and urging the driver by a physical stimulation (for example, a display, a voice, or a vibration) to operate. In addition, the execution of the drive assist control includes not only starting the drive assist itself but also improving the detection range and the detection accuracy of the target object, lowering a drive assist start condition, making a drive assist start timing earlier, and raising a drive assist level (for example, changing the intervention from the warning to the braking intervention or the like). In addition, starting the drive assist includes not only the shifting of the state form the state in which the drive assist is not executed to the state in which the drive assist is executed but also the switching of the state from the state in which the drive assist is executed to a state of another drive assist, and further executing another drive assist from the state in which the drive assist is executed. A plurality of aspects can be adopted as the procedure of determining whether to execute the drive assist control by the drive assist determination unit 36. Hereinafter, the aspects of processing by the drive assist determination unit 36 will be described in detail.

Figure 4:
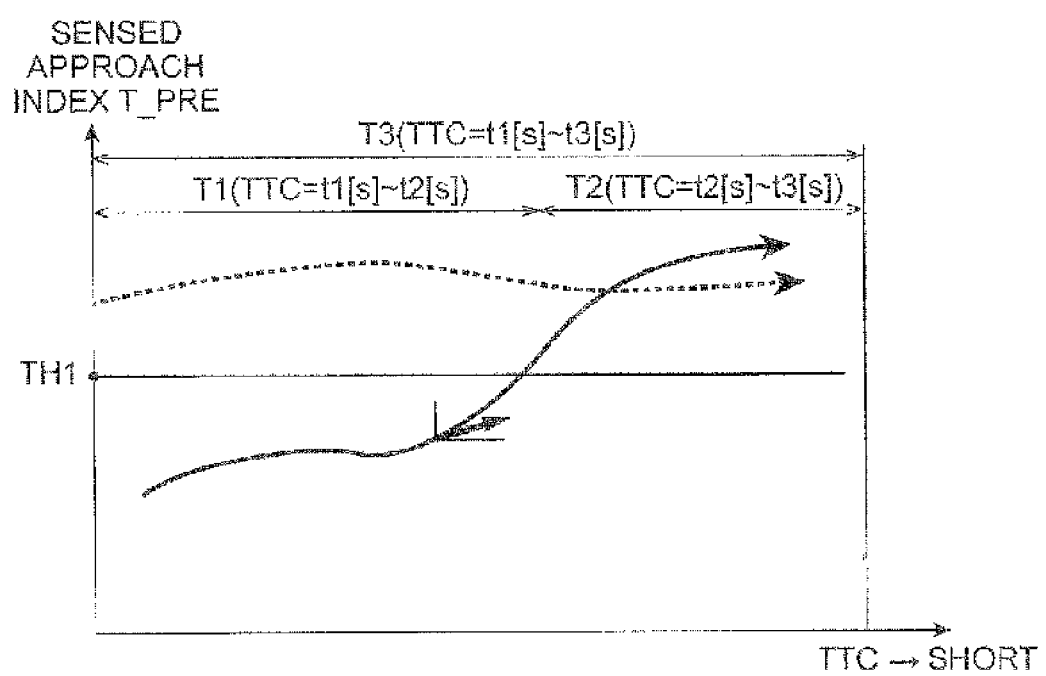
FIG. 4 is a diagram illustrating an example of a time series change of the sensed approach index when the TTC is in between t1 [s] and t3 [s].

The first aspect of the determination by the drive assist determination unit 36 will be described with reference to FIG. 4. FIG. 4 is a diagram illustrating an example of a time series change of the sensed approach index T_PRE when the time to collision (TTC) is in between t1 [s] and t3 [s]. Here, the TTC is a value indicating that how many seconds later the host vehicle collides with a moving object in a case where the host vehicle travels in the travelling direction under the current state. In FIG. 4, a period in which the TTC=t1 [s] to t2 [s] is defined as a first prediction timing T1 and a period in which the TTC=t2 [s] to t3 [s] is defined as a second prediction timing T2. The first prediction timing T1 is a timing in which the normal driver performs the accelerator-off operation to avoid the target object, and the second prediction timing T2 is a timing in which the normal driver performs the brake-on operation to avoid the target object.

In the first aspect, the drive assist determination unit 36 determines whether to execute the drive assist control of the vehicle according to whether the sensed approach index T_PRE is equal to or greater than the predetermined threshold value. Specifically, in a case where the sensed approach index T_PRE is equal to or greater than the threshold value TH1 in the first prediction timing T1 or in the second prediction timing T2, the drive assist determination unit 36 estimates that there is insufficient time for operation by the driver and determines to execute the drive assist control. Conversely, in a case where the sensed approach index T_PRE is smaller than the threshold value TH1 in the first prediction timing T1 or in the second prediction timing T2, the drive assist determination unit 36 estimates that there is sufficient time for operation by the driver and determines not to execute the drive assist control. In a case where the sensed approach index T_PRE illustrated in dashed line in FIG. 4 is acquired, since the sensed approach index T_PRE is equal to or greater than the threshold value TH1, the drive assist determination unit 36 determines to execute the drive assist control at the first prediction timing T1. The threshold value TH1 may be a value set by the designer in advance or may be a value that can be obtained from the past driving operation timing of the driver, that is, the sensed approach index T_PRE at the ordinary approaching time in the past.

The second aspect of the determination by the drive assist determination unit 36 will be described with reference to FIG. 4. In FIG. 4, a period in which the TTC=t1 [s] to t3 [s] is defined as a third prediction timing T3. In the second aspect, the drive assist determination unit 36 determines whether to execute the drive assist control of the vehicle according to whether a differential value (gradient) of the sensed approach index T_PRE is equal to or greater than the threshold value TH2. Specifically, in a case where the gradient of the time series change of the sensed approach index T_PRE in the third prediction timing T3 is equal to or greater than the threshold value TH2, the drive assist determination unit 36 estimates that the ordinary driving operation is not performed, and determines to execute the drive assist control. Conversely, in a case where the gradient of the time series change of the sensed approach index T_PRE in the third prediction timing T3 is smaller than the threshold value TH2, the drive assist determination unit 36 estimates that the ordinary driving operation is performed, and determines not to execute the drive assist control. The threshold value TH2 may be a value set by the designer in advance or may be a value that can be obtained from the past driving operation timing of the driver, that is, the sensed approach index T_PRE at the ordinary approaching time in the past. In addition, the drive assist determination unit 36 may determine whether to execute the drive assist control of the vehicle by combining the above-described first aspect and the second aspect.

Figure 5:
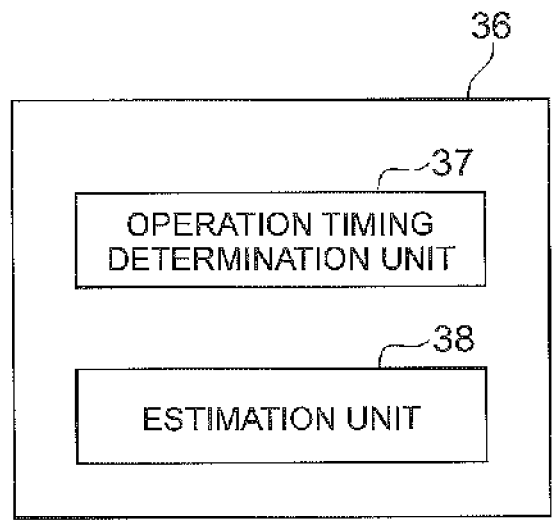
FIG. 5 is a block diagram illustrating a functional configuration of a drive assist determination unit in the third aspect.
Figure 6:
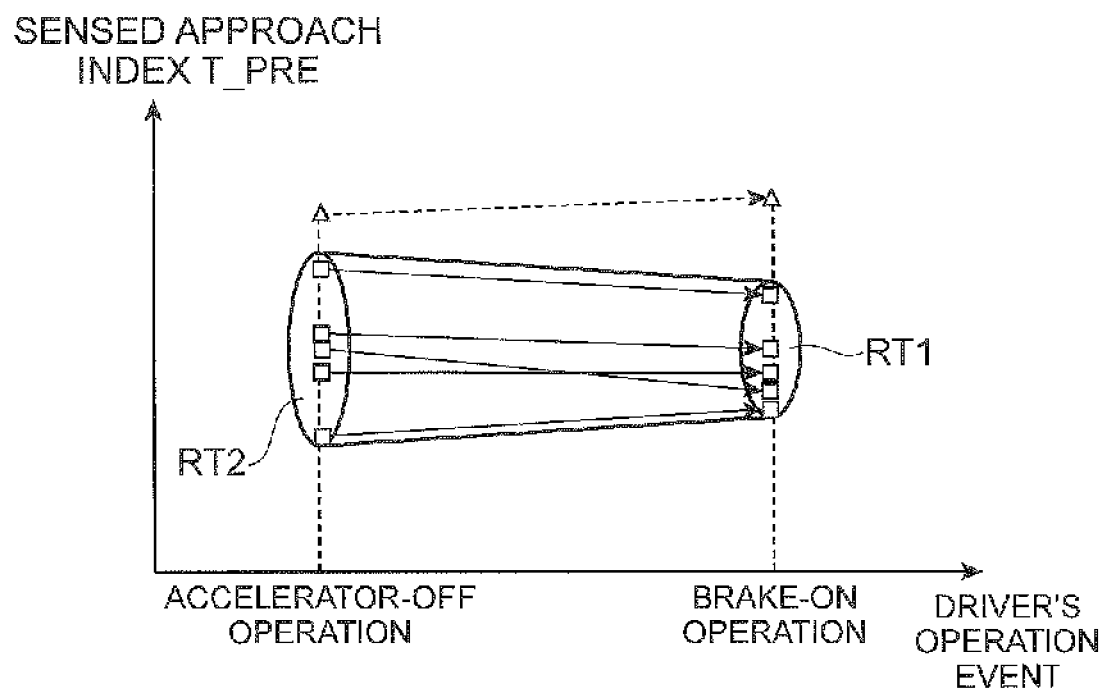
FIG. 6 is a diagram explaining a procedure of determining whether to execute the drive assist control.

The third aspect of the determination by the drive assist determination unit 36 will be described with reference to FIG. 5 and FIG. 6. In this aspect, as illustrated in FIG. 5, the drive assist determination unit 36 includes an operation timing determination unit 37 and an estimation unit 38.

The operation timing determination unit 37 determines a first recommended operation timing RT1 that indicates a timing at which the braking operation (a first driving operation) which changes the behavior of the vehicle is performed and a second recommended operation timing RT2 that indicates a timing at which the accelerator-off operation (a second driving operation) is performed, based on the sensed approach index T_PRE calculated in the past. Hereinafter, an example of the procedure of determining the first recommended operation timing RT1 and the second recommended operation timing RT2 will be described with reference to FIG. 6. The operation timing determination unit 37 stores the sensed approach index T_PRE at the time of an accelerator-off operation by the driver in the past and the sensed approach index T_PRE at the time of the brake-on operation after the accelerator-off operation in association with each other. In FIG. 6, the sensed approach indices T_PREs associated with each other are illustrated by plots of "□". In the embodiment, these sensed approach indices T_PREs may be stored for each driver.

The operation timing determination unit 37 sets the range of the sensed approach index T_PRE that frequently appears among the sensed approach index T_PRE at the time braking operation as the first recommended operation timing RT1. As an example, the range of the sensed approach index T_PRE that belongs to the range of plus and minus 1σ (70%) is set as the first recommended operation timing RT1. In addition, the operation timing determination unit 37 sets the range to which the sensed approach index T_PRE at the time of accelerator-off operation corresponding to the sensed approach index T_PRE at the time of brake-on operation within the range of the first recommended operation timing RT1 belongs, as the second recommended operation timing RT2. The first recommended operation timing RT1 is set to be earlier timing as the vehicle width direction component of the relative speed decreases or the vehicle width direction component of the relative distance increases.

The estimation unit 38 estimates whether the driver of the host vehicle performs the braking operation at the first recommended operation timing RT1 based on the execution timing of the operation of the accelerator which is the timing earlier than the first recommended operation timing RT1. In a case where the current accelerator-off operation by the driver departs from the range of the second recommended operation timing RT2, the estimation unit 38 determines to execute the drive assist control. Conversely, in a case where the current accelerator-off operation by the driver does not depart from the range of the second recommended operation timing RT2, the estimation unit 38 determines not to execute the drive assist control. In the example illustrated in FIG. 6, the sensed approach index T_PRE (illustrated by plots of "Δ" in FIG. 6) at the timing of accelerator-off operation by the driver departs from the second recommended operation timing RT2, and thus, it is estimated that the timing of brake-on operation departs from the first recommended operation timing RT1. Therefore, the drive assist control is determined to be executed at the timing of the accelerator-off operation.

In the present aspect, when the current accelerator-off operation by the driver departs from the range of the second recommended operation timing RT2, it is estimated that the braking operation is not performed in the first recommended operation timing T1, but not limited to this aspect. For example, in a case where the deceleration quantity of the host vehicle at the timing earlier than the first recommended operation timing is smaller than the predetermined deceleration quantity, it may be estimated that the driver does not perform the braking operation at the first recommended operation timing. In addition, in a case where the engine speed of the host vehicle at the timing earlier than the first recommended operation timing is less than the predetermined engine speed, it may be estimated that the driver does not perform the braking operation at the first recommended operation timing. In addition, in the embodiment, the sensed approach index T_PRE at the timing of shift-up operation by the driver in the past instead of the timing of accelerator-off operation may be calculated, and then, the second recommended operation timing may be set by the frequency of the sensed approach index.

When the drive assist control is determined to be executed, the drive assist determination unit 36 described in the first to third aspects outputs a control signal that causes the drive assist control to be executed by the output unit 40.

Returning to FIG. 1, the output unit 40 is a device configured to execute the drive assist according to the output from the drive assist ECU 30. In the embodiment, the output unit 40 includes a notification device 42, a steering control device 44, and an acceleration and deceleration control device 46. The notification device 42 is, for example, a display or a speaker, and outputs a warning indication to notify the driver based on the control signal output from the drive assist ECU 30. The steering control device 44 is a device configured to control the steering angle of the host vehicle by the control quantity according to the control signal output from the drive assist ECU 30. The acceleration and deceleration control device 46 controls the throttle actuator and the brake actuator by the control quantity according to the control signal output from the drive assist ECU 30, and controls the acceleration and deceleration of the host vehicle.

Figure 7:
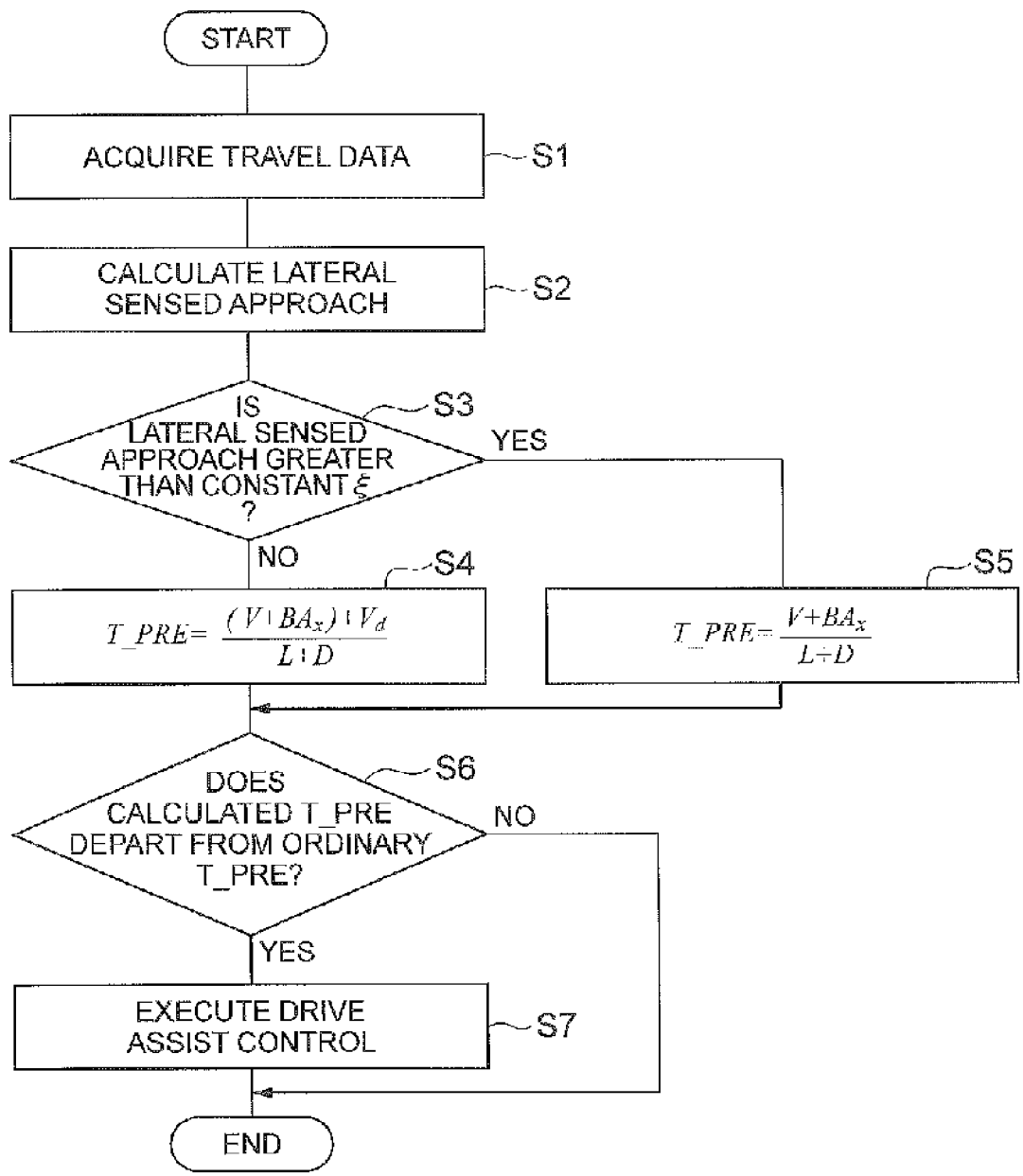
FIG. 7 is a flowchart explaining an operation of the drive assist device in the embodiment.

Next, the operation of the drive assist device 1 in the embodiment and the drive assist method in the embodiment will be described with reference to FIG. 7. FIG. 7 is a flowchart illustrating the operation of the drive assist device 1 in the embodiment. Here, it is assumed that the drive assist device 1 has calculated the ordinary sensed approach index T_PRE at the time of ordinary approaching by the driver in advance, and this ordinary sensed approach index T_PRE is stored in the storage unit (RAM) or the like in the drive assist ECU 30. The ordinary sensed approach index T_PRE has been calculated by executing the below-described steps S1 to S5 based on the vehicle travel information of the driver in the past. Each step illustrated in FIG. 7 starts by a trigger that, for example, the target object is detected to be present around the host vehicle by the drive assist device 1, and repeatedly executes in a predetermined interval.

As illustrated in FIG. 7, firstly, the drive assist ECU 30 of the drive assist device 1 acquires the host vehicle travel information, target object information, and the driving operation information from the travel state detection unit 10, the target object detection unit 12, and the driving operation detection unit 14 as the travel data (S1). Subsequently, the lateral sensed approach acquisition unit 32 of the drive assist ECU 30 calculates the lateral sensed approach from the host vehicle travel information, target object information, and the driving operation information (S2). At this time, in the embodiment, lateral sensed approach acquisition unit 32 calculates the $V_d/D$ as the lateral sensed approach.

Then, the index calculation unit 34 of the drive assist ECU 30 determines whether the lateral sensed approach $V_d/D$ is greater than the constant $\xi$ (S3). In a case where it is determined that the lateral sensed approach $V_d/D$ is not greater than the constant $\xi$ in step S3, the sensed approach index T_PRE is calculated using the relative relationship relating to the width direction component and the travelling direction component of the host vehicle among the relative relationships between the host vehicle and the target object. Specifically, the sensed approach index T_PRE is calculated using above-described Equation (4) (S4, index calculation step). On the other hand, in a case where it is determined that the lateral sensed approach $V_d/D$ is greater than the constant $\xi$ in step S3, the sensed approach index T_PRE is calculated using the relative relationship relating to the travelling direction component of the host vehicle among the relative relationships between the host vehicle and the target object. Specifically, the sensed approach index T_PRE is calculated using above-described Equation (5) (S5, index calculation step).

Then, the drive assist determination unit 36 of the drive assist ECU 30 compares the current sensed approach index T_PRE calculated in step S4 or step S5 and the ordinary sensed approach index T_PRE stored in the drive assist ECU 30, and determines whether the current sensed approach index T_PRE departs from the ordinary sensed approach index T_PRE (S6, drive assist determination step). In a case where it is determined that the current sensed approach index T_PRE departs from the ordinary sensed approach index T_PRE, the drive assist determination unit 36 outputs the control signal to the output unit 40 and executes the drive assist control (S7). On the other hand, in a case where it is determined that the current sensed approach index T_PRE does not depart from the ordinary sensed approach index T_PRE, a series of control processing ends without executing the drive assist control.

Figure 8:
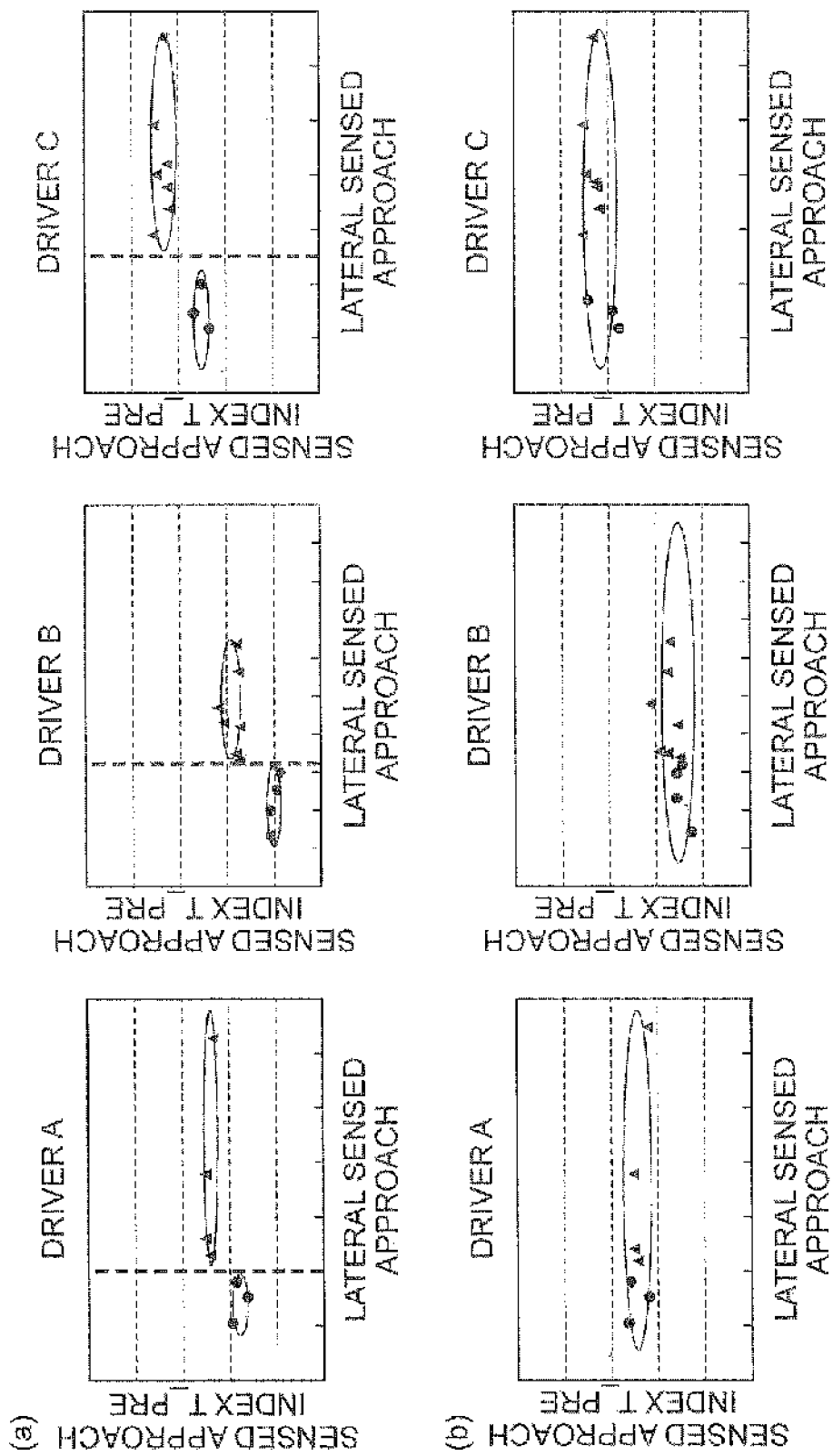
FIG. 8 is a diagram illustrating a relationship between the lateral sensed approach and the sensed approach index acquired when examinee drivers drive the vehicle.

Next, an operation effect of the drive assist device 1 in the embodiment will be described with reference to FIG. 8 and FIG. 9. FIG. 8 is a graph illustrating a relationship between the lateral sensed approach and the sensed approach index T_PRE acquired when three examinee drivers of A to C drive the vehicles. FIG. 8(a) illustrates an example of calculating the sensed approach index T_PRE using only the information relating to the travelling direction of the vehicle regardless of the lateral sensed approach (that is, always using Equation (5)). FIG. 8(b) illustrates an example of calculating the sensed approach index T_PRE using the relative relationship relating to the travelling direction of the vehicle and the relative relationship relating to the width direction of the vehicle (that is, using Equation (4)) in a case where the lateral sensed approach $V_d/D$ is smaller than the constant $\xi$, and calculating the sensed approach index T_PRE using only the relative relationship relating to the travelling direction of the vehicle (that is, using equation (5)) in a case where the lateral sensed approach $V_d/D$ is equal to or greater than the constant $\xi$.

As illustrated in FIG. 8(a), in a case of calculating the sensed approach index T_PRE using only the relative relationship relating to the travelling direction of the vehicle, it can be understood that the calculated sensed approach indices T_PRE are deviated from each other in the period in which the lateral sensed approach is small and in the period in which the lateral sensed approach is large. Specifically, the sensed approach index T_PRE in the period in which the lateral sensed approach is small is calculated to be relatively small, and the sensed approach index T_PRE in the period in which the lateral sensed approach is large is calculated to be relatively large. As above, in a case where the lateral sensed approach is small, the driver feels that a future behavior of the target object is not clear, and thus, the operation timing of the driver becomes relatively early. Therefore, the sensed approach index T_PRE is calculated to be small, and thus, it is estimated that the deviation occurs.

In contrast, according to the drive assist device 1 in the embodiment, as illustrated in FIG. 8(b), a substantially constant sensed approach index T_PRE is calculated regardless of the lateral sensed approach. As described above, by changing the procedure of calculating the sensed approach index T_PRE according to the lateral sensed approach, it can be understood that the sensed approach by the driver with respect to the target object can appropriately be expressed. Therefore, according to the drive assist device 1 in the embodiment, it is possible to execute the drive assist that matches the feeling of the driver.

FIG. 9 is a graph illustrating the sensed approach index T_PRE at the timing when three examinee drivers A to C perform accelerator-off operations and the sensed approach index T_PRE at the timing when the examinee drivers perform brake-on operations after accelerator-off operations. FIG. 9(a) illustrates an example of calculating the sensed approach index T_PRE using only the relative relationship relating to the travelling direction of the vehicle regardless of the lateral sensed approach (that is, always using Equation (5)). An example of calculating the sensed approach index T_PRE is illustrated in FIG. 9(b) using the relative relationship relating to the travelling direction of the vehicle and the relative relationship relating to the width direction of the vehicle (that is, using Equation (4)) in a case where the lateral sensed approach $V_d/D$ is smaller than the constant $\xi$, and calculating the sensed approach index T_PRE using only the relative relationship relating to the travelling direction of the vehicle (that is, using equation (5)) in a case where the lateral sensed approach $V_d/D$ is equal to or greater than the constant $\xi$.

As described in FIG. 9(b), according to the drive assist device 1 in the embodiment, it can be understood that the first recommended operation timing RT1 and the second recommended operation timing RT2 are acquired, of which the ranges are smaller than that of the first recommended operation timing RT1 and the second recommended operation timing RT2 illustrated in FIG. 9(a). This is because the sensed approach index T_PRE stabilized by the drive assist device 1 is acquired. In addition, at the timing of the accelerator-off operation, it becomes possible to accurately determine whether the brake-on operation is performed at the ordinary timing. That is, it is possible to increase the accuracy of distinguishing the case of the ordinary drive operation and the non-ordinary drive operation of the driver.

As described above, according to the drive assist device 1 and the drive assist method in the present embodiment, as the vehicle width direction component of the relative speed between the vehicle and the target object relatively decreases, or as the vehicle width direction component of the relative distance between the vehicle and target object increases, the index is calculated with increasing the degree of influence of the relative relationship relating to the vehicle width direction component among the relative relationships between the vehicle and the target object. Therefore, it is possible to acquire the index in line with the feeling of the driver. Then, it is possible to execute the drive assist control without causing the driver discomfort, by determining to execute the drive assist control of the vehicle based on the index.

An embodiment of the present invention is described as above. However, the present invention is not limited to the embodiment described above and the embodiment can configure a variety of modified aspects. For example, in the embodiment described above, the lateral sensed approach is calculated as $D/V_d$, but may be calculated as $V_d/D$. In this case, the index calculation unit 34 may calculate the sensed approach index T_PRE by Equation (4) in a case where the lateral sensed approach $V_d/D$ is greater than the constant $\xi$, and may calculate the sensed approach index T_PRE by Equation (5) in a case where the lateral sensed approach $V_d/D$ is equal to or smaller than the constant $\xi$..

In addition, the lateral sensed approach may be calculated by considering any physical quantity such as a vehicle width direction component of a relative acceleration as long as the lateral sensed approach is expressed by at least a ratio of a term including the vehicle width direction component of the relative speed and a term including the vehicle width direction component of the relative distance. In addition, the change rate of the K1 and K2 with respect to the lateral sensed approach in Equation (3) may be adapted according to the characteristics of each person.

In addition, in the embodiment, the drive assist determination unit 36 may determine whether to execute the drive assist control of the vehicle based on the index only in a case where the target object approaches the host vehicle. According to this way, it is possible to prevent the drive assist from being executed in a case where the target object is moving away from the host vehicle and the possibility of the collision between the vehicle and the target object is low.

The index calculation unit 34 may calculate the sensed approach index T_PRE using below-described Equation (6) instead of using Equation (4). By calculating the sensed approach index T_PRE by adjusting the coefficients K1 and K2 expressed in Equation (6), it becomes possible to calculate the sensed approach index T_PRE by adjusting the degree of the influence of the relative relationship relating to the vehicle width direction component among the relative relationships between the vehicle and the target object according the lateral sensed approach.

$$T\_PRE = \{(V + B \cdot A_x) + K1 \cdot V_d\} / \{L + K2 \cdot D\} \tag{6}$$

REFERENCE SIGNS LIST

1 . . . drive assist device, 10 . . . travel state detection unit, 12 . . . target object detection unit, 14 . . . driving operation detection unit, 16 . . . vehicle speed sensor, 18 . . . acceleration sensor, 20 . . . radar, 22 . . . outside camera, 24 . . . brake pedal sensor, 26 . . . accelerator pedal sensor, 28 . . . shift sensor, 32 . . . lateral sensed approach acquisition unit, 34 . . . index calculation unit, 36 . . . drive assist determination unit, 37 . . . operation timing determination unit, 38 . . . estimation unit, 40 . . . output unit, 42 . . . notification device, 44 . . . steering control device, 46 . . . acceleration and deceleration control device.

The invention claimed is:
1. A drive assist device comprising:
an ECU configured to:
calculate an index relating to a relative relationship between a vehicle and a target object;

determine whether to execute a drive assist control of the vehicle based on the index; and control, in response to the ECU executing the drive assist control, the vehicle to perform at least one from among avoiding the target object and stabilizing a behavior of the vehicle, wherein, in a case where a lateral sensed approach, which is expressed by a ratio of the vehicle width direction component of a relative speed between the vehicle and the target object and the vehicle width direction component of the relative distance, is smaller than a predetermined threshold value, the ECU is configured to calculate the index using below-described Equation (1)

$$T\_PRE = \{(V + B \cdot A_x) + K1 \cdot V_d\}/\{L + K2 \cdot D\} \quad (1), \text{ and}$$

wherein, in a case where the lateral sensed approach is equal to or greater than the predetermined threshold value, the ECU is configured to calculate the index using below-described Equation (2)

$$T\_PRE = (V + B \cdot A_x)/L \quad (2)$$

wherein in the Equations (1) and (2), T_PRE is the index, V is the vehicle travelling direction component of the relative speed, $V_d$ is the vehicle width direction component of the relative speed, $A_x$ is a deceleration of the vehicle, L is the vehicle travelling direction component of the relative distance, D is the vehicle width direction component of the relative distance, B is a predetermined coefficient, and K1 and K2 are arbitrary coefficients.

2. The drive assist device according to claim 1, wherein, in a case where the target object approaches the vehicle, the ECU is configured to determine whether to execute the drive assist control based on the index.

3. The drive assist device according to claim 1, wherein the ECU is further configured to:
determine, based on the index, a first recommended operation timing that indicates a timing at which a first driving operation which changes the behavior of the vehicle is performed; and
estimate, at the timing earlier than the first recommended operation timing, whether a driver of the vehicle performs the first driving operation at the first recommended operation timing, and
wherein, in a case where it is estimated that the driver of the vehicle does not perform the first driving operation at the first recommended operation timing, the ECU is configured to determine to execute the drive assist control.

4. The drive assist device according to claim 3, wherein the ECT is configured to estimate whether the driver of the vehicle performs the first driving operation at the first recommended operation timing based on the execution timing of the second driving operation which is performed by the driver at the timing earlier than the first driving operation.

5. The drive assist device according to claim 4, wherein, based on the index, the ECU is configured to determine a second recommended operation timing that indicates a timing at which the second driving operation is performed, and
wherein, in a case where the driver does not perform the second driving operation at the second recommended operation timing, the ECU is configured to estimate that the driver of the vehicle does not perform the first driving operation at the first recommended operation timing.

6. The drive assist device according to claim 4, wherein the second driving operation is an operation of an accelerator or a shift operation by the driver.

7. The drive assist device according to claim 4, wherein the second driving operation is an accelerator-off operation or a shift-up operation by the driver.

8. The drive assist device according to claim 3, wherein the first driving operation is a braking operation by the driver.

9. The drive assist device according to claim 3, wherein the first driving operation is a brake-on operation by the driver.

10. The drive assist device according to claim 3, wherein the ECU is configured to estimate whether the driver of the vehicle performs the first driving operation at the first recommended operation timing based on the travel state of the vehicle at the timing earlier than the first recommended operation timing.

11. The drive assist device according to claim 10, wherein, in a case where a deceleration quantity of the vehicle at the timing earlier than the first recommended operation timing is smaller than a predetermined deceleration quantity, the ECU is configured to estimate that the driver does not perform the first driving operation at the first recommended operation timing.

12. The drive assist device according to claim 10, wherein, in a case where an engine speed of the vehicle at the timing earlier than the first recommended operation timing is less than a predetermined engine speed, the ECU is configured to estimate that the driver does not perform the first driving operation at the first recommended operation timing.

13. A drive assist method to be carried out by the drive assist device according to claim 1, the method comprising:
an index calculation step of causing the ECU to calculate an index relating to a relative relationship between a vehicle and a target object; and
a drive assist determination step of causing the ECU to determine whether to execute a drive assist control of the vehicle based on the index,
wherein, in the index calculation step in a case where the lateral sensed approach, which is expressed by a ratio of the vehicle width direction component of a relative speed between the vehicle and the target object and the vehicle width direction component of the relative distance, is smaller than a predetermined threshold value, the index is calculated using following Equation (1), $$T\_PRE = \{(V + B \cdot Ax) + K1 \cdot V_d\}/\{L + K2 \cdot D\} \quad (1), \text{ and}$$

wherein, in a case where a lateral sensed approach is equal to or greater than the predetermined threshold value, the index is calculated using following Equation (2)

$$T\_PRE = (V + B \cdot Ax)/L \quad (2),$$

wherein in the Equations (1) and (2), T_PRE is the index, V is the vehicle travelling direction component of the relative speed, $V_d$ is the vehicle width direction component of the relative speed, Ax is a deceleration of the vehicle, L is the vehicle travelling direction component of the relative distance, D is the vehicle width direction component of the relative distance, B is a predeteimined coefficient, and K1 and K2 are arbitrary coefficients.

14. A drive assist device comprising:
an ECU configured to:
- determine a first recommended operation timing that indicates a timing at which a first driving operation to change a behavior of a vehicle is performed based on an index relating to a relative relationship between the vehicle and a target object;
- estimate, at a timing earlier than the first recommended operation timing, whether a driver of the vehicle performs the first driving operation at the first recommended operation timing;
- determine to execute the drive assist of the vehicle in a case where it is estimated that the driver does not perform the first drive operation at the first recommended operation timing;

control, in response to the ECU executing the drive assist control, the vehicle to perform at least one from among avoiding the target object and stabilizing a behavior of the vehicle,
- wherein, the ECU is configured to make the first recommended operation timing such that the first recommended operation timing becomes early as a vehicle width direction component of the relative speed between the vehicle and the target object decreases or the vehicle width direction component of the relative distance between the vehicle and the target object increases, wherein, in a case where the lateral sensed approach is smaller than a predetermined threshold value, the index is calculated using following Equation (1), $$T\_PRE = \{(V+B \cdot Ax) + K1 \cdot V_d\}/\{L + K2 \cdot D\} \qquad (1), \text{ and}$$

wherein, in a case where a lateral sensed approach, which is expressed by a ratio of the vehicle width direction component of a relative speed between the vehicle and the target object and the vehicle width direction component of the relative distance, is equal to or greater than the predetermined threshold value, the ECU is configured to calculate the index using following Equation (2), $$T\_PRE = (V + B \cdot Ax)/L \qquad (2)$$

wherein in the Equations (1) and (2), T_PRE is the index, V is the vehicle travelling direction component of the relative speed, $V_d$ is the vehicle width direction component of the relative speed, Ax is a deceleration of the vehicle, L is the vehicle travelling direction component of the relative distance, D is the vehicle width direction component of the relative distance, B is a predetermined coefficient, and K1 and K2 are arbitrary coefficients.

15. The drive assist device according to claim 14,
wherein the ECU is configured to estimate whether the driver of the vehicle performs the first driving operation at the first recommended operation timing based on the execution timing of the second driving operation which is performed by the driver at the timing earlier than the first driving operation.

16. The drive assist device according to claim 15,
wherein, the ECU is configured to determine the second recommended operation timing that indicates a timing at which the second driving operation is performed, based on the travel state of the vehicle, and
wherein, the ECU is configured to estimate that the driver of the vehicle does not perform the first driving operation at the first recommended operation timing, in a case where the driver does not perform the second driving operation at the second recommended operation timing.

* * * * *